United States Patent [19]
Balzer

[11] 3,912,094
[45] Oct. 14, 1975

[54] FORAGE COLLECTING AND DISPENSING APPARATUS

[76] Inventor: Abram P. Balzer, Mountain Lake, Minn. 56159

[22] Filed: June 24, 1974

[21] Appl. No.: 481,980

[52] U.S. Cl. .............................. 214/83.36; 198/108
[51] Int. Cl.² .......................................... B60P 1/38
[58] Field of Search............. 214/83.36, 83.26, 519, 214/521, 522; 198/108

[56] References Cited
UNITED STATES PATENTS

| | | | |
|---|---|---|---|
| 3,179,305 | 4/1965 | Wiens | 214/83.36 X |
| 3,348,714 | 10/1967 | Ash | 214/83.36 X |
| 3,477,599 | 11/1969 | De Coene | 214/519 |
| 3,556,327 | 1/1971 | Garrison | 214/522 |

Primary Examiner—Albert J. Makay
Attorney, Agent, or Firm—Merchant, Gould, Smith & Edell

[57] ABSTRACT

A receptacle for cut crop mounted on a horizontal mobile frame and extending generally transversely of the direction of movement of the frame, the receptacle having generally vertical front and rear walls, an end wall, and a bottom wall sloping from the lower end of the end wall at one side of the frame upwardly and outwardly of the other side of the frame, terminating in a discharge end at a substantial height above ground level. An endless conveyor has a delivery flight overlying the bottom wall for conveying material in the receptacle toward the upper discharge end of the bottom wall. An opening in the front wall provides access for material into the interior of the receptacle, and a portion of the receptacle is covered by an open mesh top wall.

1 Claim, 4 Drawing Figures

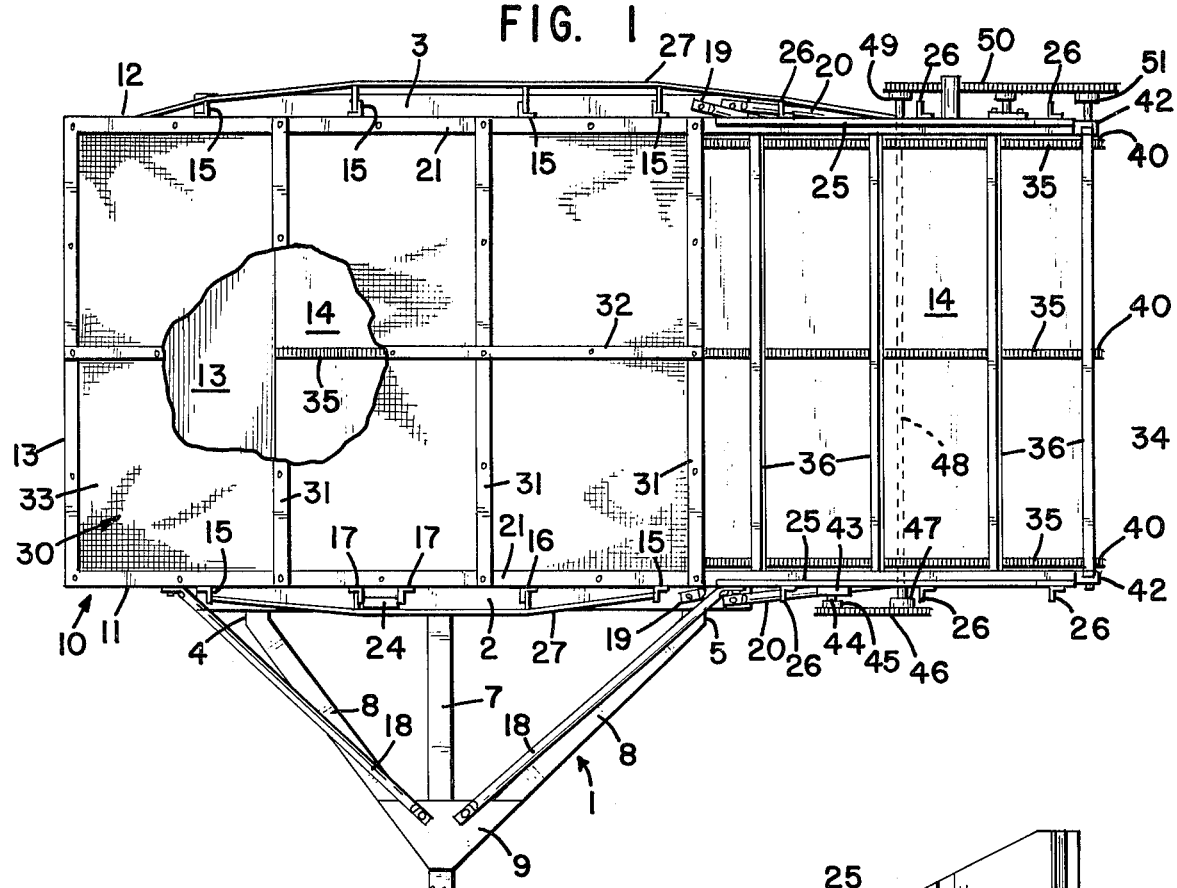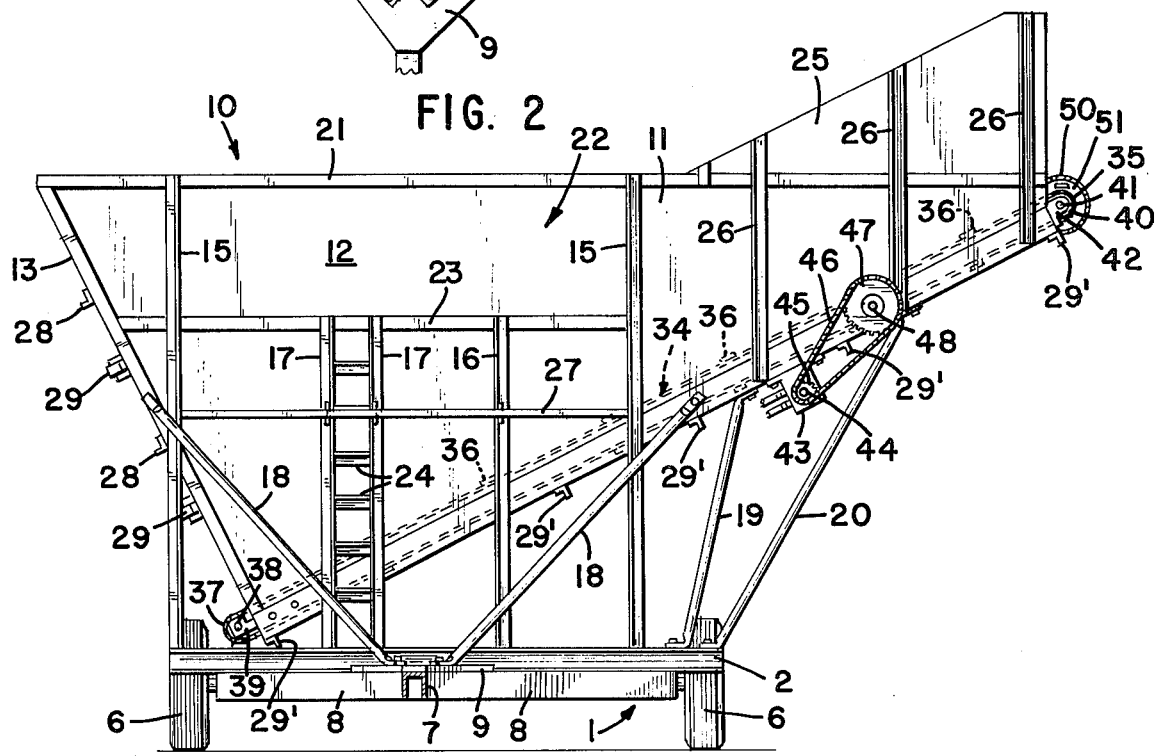

3,912,094

FORAGE COLLECTING AND DISPENSING APPARATUS

SUMMARY OF THE INVENTION

An important object of this invention is the provision of apparatus including a receptacle which can be attached to a harvesting implement for movement therewith through a field, and into which a cut crop can be placed and permitted to accumulate until a transporting vehicle is moved alongside the apparatus for reception of the accumulated material therefrom. Another object of this invention is the provision of apparatus as set forth in which the receptacle has a bottom equipped with a conveyor and which slopes upwardly toward an elevated discharge portion for feeding the accumulated material into a transport vehicle.

To the above and further ends, I provide a horizontal mobile support frame having a hitch bar for attachment to a mobile harvester for movement therewith, and a receptacle mounted on the support frame. The receptacle includes front and rear walls that are elongated in a direction transversely of the direction of movement of the frame, an end wall connecting the front and rear walls at one end and extending upwardly from one side of the support frame, and a bottom wall that slopes upwardly from the bottom of the end wall and beyond the opposite side of the support frame. The upper end of the bottom wall is disposed at a height sufficiently above ground level to overlie a transport vehicle, so that crop material in the receptacle can be moved over the upper discharge end of the bottom wall and dropped into the vehicle. An endless conveyor extends longitudinally of, and has an upper feeding flight overlying the bottom wall, the upper flight being operative to move toward the upper discharge end of the bottom wall. The front wall of the receptacle is formed to provide an opening through which the harvested crop may be introduced to the interior of the receptacle. A portion of the receptacle, adjacent the end wall and the opening, is covered by an open mesh top wall; and portions of the front and rear walls, adjacent the discharge end of the bottom wall, extend upwardly to guide material being delivered to the discharge end.

DESCRIPTION OF THE DRAWINGS

FIG. 1 is a view in top plan of the forage collecting and dispensing apparatus of this invention, some parts being broken away;

FIG. 2 is a view in front elevation;

DETAILED DESCRIPTION OF THE PREFERRED EMBODIMENT

Figure 3:
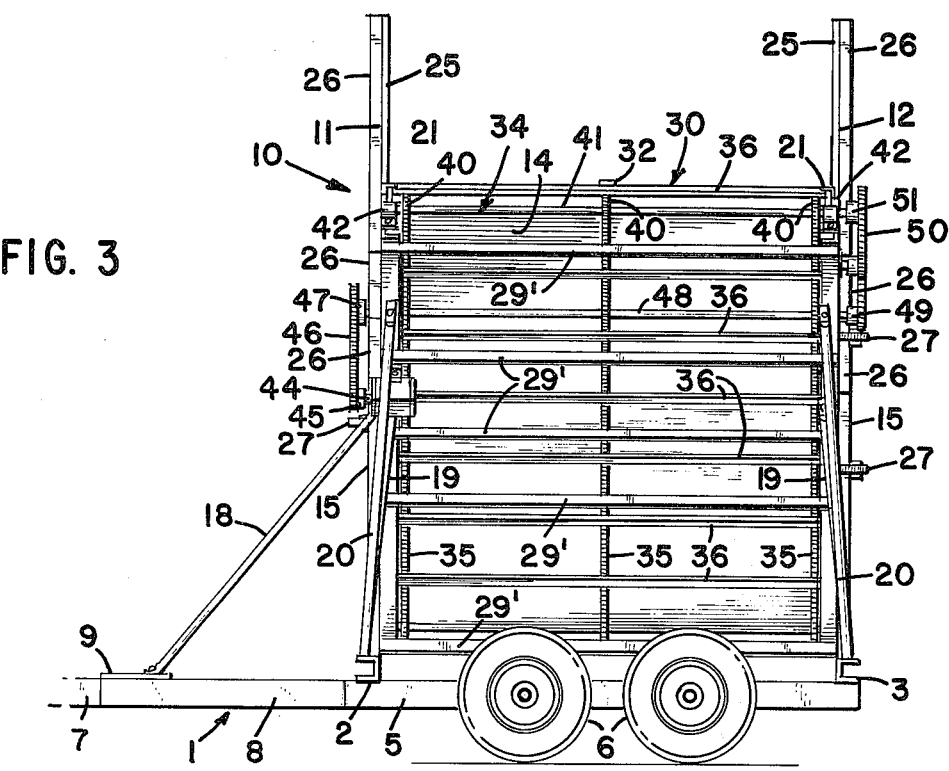
FIG. 3 is a view in side elevation as seen from the right to the left of FIG. 2.
Figure 4:
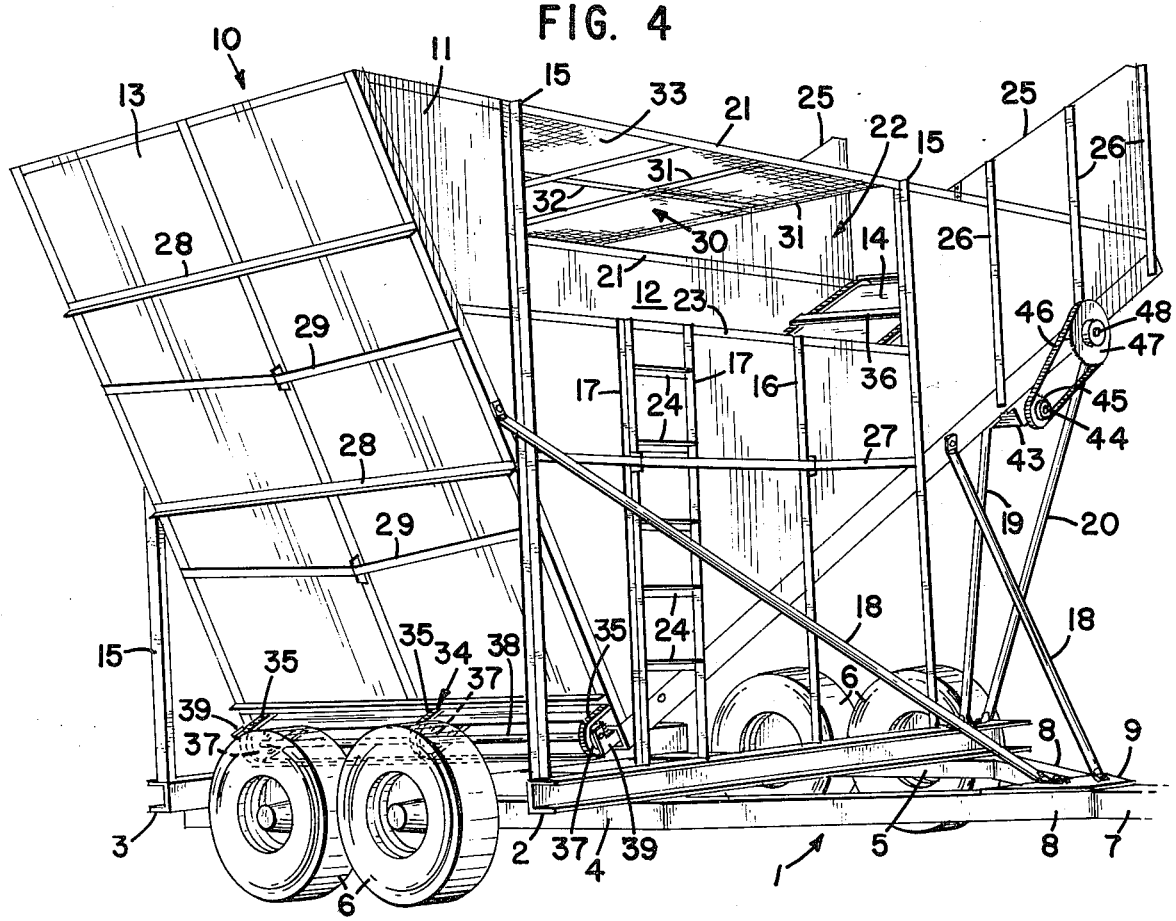
FIG. 4 is a view in perspective as seen from the front and the side opposite that shown in FIG. 3.

A horizontally disposed mobile frame is indicated generally at 1, the same comprising spaced parallel transverse front and rear frame members 2 and 3 respectively, and opposite side frame members 4 and 5 disposed in laterally spaced parallel relationship at generally right angles to the frame members 2 and 3, and rigidly secured thereto by welding or other suitable means. Pairs of pneumatic tire equipped wheels 6 are suitably mounted on the side frame members 4 and 5, enabling the frame 1 and parts carried thereby to be easily moved over the ground. A conventional hitch bar 7 has its rear end secured to the front frame member 2 and extends forwardly therefrom, the hitch bar 7 braced by angular brace bars 8 extending angularly toward each other and the hitch bar 7 from the front ends of the side frame members 4 and 5. The front ends of the brace bars 8 and the adjacent portion of the hitch bar 7 are welded together and to a generally triangular gusset member 9 to provide a rigid structure. The extreme front end of the hitch bar 7, not shown, may be assumed to be adapted for connection to a towing vehicle, such as a harvesting machine or tractor, not shown.

A receptacle, indicated generally at 10, comprises a pair of generally vertically disposed front and rear walls 11 and 12, respectively, these being elongated in a direction transversely of the direction of movement of the frame 1, and being connected by an end wall 13 that extends angularly upwardly and laterally outwardly adjacent the side frame member 4 of the support frame 1. The spaced parallel front and rear walls 11 and 12 have lower edges that slope upwardly and laterally away from the bottom of the end wall 13, the lower edges of the front and rear walls 11 and 12 being joined by a bottom wall 14 that also slopes angularly upwardly and away from the bottom edge of the end wall 10. As shown, the front and rear walls 11 and 12, together with the bottom wall 14, extend laterally outwardly a substantial distance beyond the side frame member 5 of the support frame 1, the bottom wall 14 and the lower edges of the front and rear walls sloping upwardly at such an angle that the outer end of the bottom wall 14 is disposed a substantial height above ground level, so as to permit passage of a wagon or truck thereunder. The receptacle 10 is supported from the support frame 1 by main support legs 15, auxiliary support legs 16 and 17, brace members 18, and pairs of other brace members 19 and 20. The main or primary support legs 15 extend upwardly from the front and rear frame members 2 and 3, and are bolted or otherwise rigidly secured at their upper ends to horizontal edge reinforcing bars 21 at upper edge portions of the front and rear walls 11 and 12. A portion of the front wall 11 is cut away between the main support legs 15 thereof to provide an opening 22 therebetween through which harvested crop, such as hay, may be introduced to the interior of the receptacle 10. The top of the opening 22 is defined by the adjacent reinforcing bar 21, the bottom of the opening 22 being defined by a horizontally disposed reinforcing bar 23 that is secured to the adjacent main legs 15 and the upper ends of the auxiliary legs 16 and 17. A plurality of vertically disposed rungs 24 are secured to the legs 17 and cooperate therewith to provide a ladder by means of which the user may reach the opening 22. The front and rear walls 11 and 12 further include upwardly projecting wall sections 25 that are secured to their respective front and rear walls 11 and 12 by brace members 26. The front and rear walls 11 and 12 are braced by tie members 27, the end wall 10 being braced by cross frame members 28 and tie members 29, the lower edges of the front and rear wall members being connected by cross members 29'.

The receptacle 10 includes a top wall 30 that extends from the upper end of the end wall 13 to the inner ends of the wall sections 25, the top wall 30 comprising cross bars 31 secured at their opposite ends to the reinforcing bars 21, a generally central longitudinal bar 32 riveted or otherwise rigidly connected to the cross bars 31 and to the upper end of the end wall 13, and a panel 33 of open mesh material secured to the cross bars 31, longitudinal bar 32 and the edge bars 21. The panel 33 may be made from any suitable material, such as coarsely woven metal screening, perforated sheet metal, or any other material which will permit free passage of air therethrough while preventing escape therethrough of harvested hay or other crop which may be introduced to the interior of the receptacle through the opening 22 by force of air pressure or otherwise.

At its lower inner end, the bottom wall 14 is downwardly spaced from the bottom edge of the end wall 13 and has mounted thereon an endless conveyor 34 which comprises a plurality of endless conveyor chains 35 connected by spaced parallel transverse feed bars 36. The chains 35 are entrained over sprocket wheels 37 that are mounted on a shaft 38 journalled in bearings 39, one of the sprocket wheels 37 and bearings 39 being shown in FIG. 2, adjacent the lower end of the end wall 13. At the opposite end of the bottom wall 14, the chains 35 are entrained over other sprocket wheels 40 that are mounted fast on a shaft 41 journalled in bearings 42 suitably mounted on the bottom wall 14 at the upper discharge end of the receptacle 10.

The endless conveyor 34 is so disposed with respect to the bottom wall 14 that a feeding flight of the conveyor is disposed on the upper side of the bottom wall 14, a return flight of the conveyor 34 underlying the bottom wall 14. Rotation is imparted to the shaft 41 in a direction to move the upper delivery flight of the conveyor 34 toward the upper discharge end of the bottom wall 14, by any suitable means. One such means is illustrated, the same including a rotary fluid pressure operated motor 43 mounted on the underside of the receptacle 10, below the bottom wall 14, the motor 43 having a drive shave 44 on which is mounted a drive sprocket wheel 45. An endless drive chain 46 is entrained over the sprocket wheel 45 and a second sprocket wheel 47 that is mounted on a jack-shaft 48 adjacent the front wall 11. The jack-shaft extends transversely of the bottom wall 14 and has mounted on its opposite ends a sprocket wheel 49 over which is entrained an endless drive chain 50. The drive chain 50 is also entrained over a sprocket wheel 51 that is rigidly mounted on the shaft 41 adjacent the rear wall 12 of the receptacle 10.

In operation, the above-described apparatus is connected to a towing vehicle, such as a tractor, in connection with a harvesting machine, for movement therewith over a field to be harvested. As the apparatus moves through a field, the harvesting implement is disposed to deliver cut crop to the interior of the receptacle 10 through the opening 22 thereof. When the receptacle approaches a filled condition, a truck or wagon is driven into underlying relationship with the upper discharge end of the bottom wall 14 and endless conveyor 34, and the motor 43 is energized to impart conveying movement to the chains 35 and feed bars 36. This may be done while the apparatus is stationary or moving, as desired. The conveyor 34 moves the crop material upwardly and laterally outwardly between the front and rear wall extension sections 25, discharging the material into the truck or wagon box, not shown. When the vehicle has received a full load, the motor 43 is de-energized and the vehicle driven to a point of delivery while the harvesting apparatus and the forage collecting and dispensing apparatus continues to move over the field, harvesting and accumulating the crop. Thus, a single person can operate the harvesting and accumulating apparatus while another person drives the delivery vehicle between the receptacle and the point of delivery of the material, such as a filo or other storage apparatus.

While I have shown and described a preferred embodiment of may forage collecting and dispensing apparatus, it will be understood that the same is capable of modification without departure from the spirit and scope of the invention, as defined in the claims.

What is claimed is:

1. A forage collecting and dispensing apparatus comprising:
   a. a mobile support frame having opposite sides and including means for connection to a draft vehicle;
   b. a receptacle mounted on the support frame for reception of cut crop and comprising:
      1. spaced apart generally vertical front and rear walls, elongated in a direction transversely of the direction of movement of the support frame;
      2. an end wall connecting the front and rear walls at one end and extending upwardly from one side of the support frame;
      3. an elongated bottom wall connecting the front and rear walls and having an inner end adjacent the lower end of said end wall, said bottom wall sloping upwardly and laterally away from said end wall and having an outer discharge end disposed laterally outwardly beyond the other side of said support frame and substantially at a level with the upper end of said end wall;
      4. and a generally horizontal open mesh top wall-forming screen extending between said front and rear walls and transversely from the upper end of said end wall toward the outer end of said bottom wall, said screen having an inner end inwardly spaced from said outer discharge end of the bottom wall;
      5. said front and rear walls having portions projecting upwardly beyond the level of said screen between the screen and the discharge end of said bottom wall and cooperating with the adjacent portion of the bottom wall to define an open-topped discharge chute;
      6. portions of said front wall and said screen cooperating to define a material receiving inlet opening to the interior of the receptacle laterally inwardly of said chute;
   c. an endless conveyor extending longitudinally of said bottom wall from said end wall to said outer discharge end and having an upper delivery flight overlying the bottom wall.
   d. and means for imparting movement to said conveyor in a direction to move said delivery flight toward said discharge end.

* * * * *